(12) United States Patent
Vejlgaard et al.

(10) Patent No.: US 12,525,997 B2
(45) Date of Patent: Jan. 13, 2026

(54) GROUP DELAY COMPENSATION

(71) Applicant: Nokia Technologies Oy, Espoo (FI)

(72) Inventors: Benny Vejlgaard, Gistrup (DK);
Oana-Elena Barbu, Aalborg (DK);
Johannes Harrebek, Aalborg (DK)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 17/526,246

(22) Filed: Nov. 15, 2021

(65) Prior Publication Data
US 2022/0158662 A1 May 19, 2022

(30) Foreign Application Priority Data
Nov. 17, 2020 (FI) ........................... 20206167

(51) Int. Cl.
H04B 1/00 (2006.01)
(52) U.S. Cl.
CPC ................... H04B 1/0017 (2013.01)
(58) Field of Classification Search
CPC ................................................. H04B 1/0017
See application file for complete search history.

(56) References Cited

U.S. PATENT DOCUMENTS

| | | | |
|---|---|---|---|
| 5,790,032 A * | 8/1998 | Schmidt | A61B 5/0507 342/28 |
| 6,518,921 B1 | 2/2003 | Irvin et al. | |
| 8,880,096 B2 | 11/2014 | Rousu et al. | |
| 9,106,402 B2 | 8/2015 | Belitzer | |
| 9,949,160 B2 | 4/2018 | Fischer | |
| 10,263,569 B2 | 4/2019 | Kim | |
| 11,889,436 B2 * | 1/2024 | King | H04B 17/14 |
| 2004/0141552 A1 | 7/2004 | Yang et al. | |
| 2005/0059360 A1 | 3/2005 | Kenington | |
| 2010/0067363 A1 | 3/2010 | Yu | |
| 2011/0013688 A1 | 1/2011 | Seo et al. | |

(Continued)

FOREIGN PATENT DOCUMENTS

| | | | |
|---|---|---|---|
| EP | 2056496 A1 | 5/2009 | |
| GB | 2505542 A * | 3/2014 | G01S 19/235 |

OTHER PUBLICATIONS

Fortenberry et al., "Improvement of group delay measurement accuracy using a two-frequency modulation phase-shift method," in IEEE Photonics Technology Letters, vol. 15, No. 5, pp. 736-738, May 2003. (Year: 2003).*

(Continued)

*Primary Examiner* — Sam K Ahn
*Assistant Examiner* — Amneet Singh
(74) *Attorney, Agent, or Firm* — SQUIRE PATTON BOGGS (US) LLP

(57) ABSTRACT

A method, apparatus and computer program is described comprising: providing a filtered transmit signal for transmission using a transmit forward path of a transmitter of a mobile communication system; receiving a receive signal using a wideband transmit feedback path of the transmitter of the mobile communication system; generating an estimate of a transfer function of the transmit forward path; and calculating a filter function for compensating for said estimated transfer function of the transmit forward path.

10 Claims, 12 Drawing Sheets

(56) References Cited

U.S. PATENT DOCUMENTS

| | | | |
|---|---|---|---|
| 2011/0195672 A1* | 8/2011 | Pratt | H04B 1/525 455/295 |
| 2013/0162470 A1 | 6/2013 | Rousu et al. | |
| 2013/0182792 A1 | 7/2013 | Wyville | |
| 2013/0336505 A1* | 12/2013 | Button | H04R 1/403 381/303 |
| 2017/0353163 A1* | 12/2017 | Gazneli | H03F 3/195 |
| 2020/0137607 A1 | 4/2020 | Akkarakaran et al. | |
| 2020/0153517 A1 | 5/2020 | Akkarakaran et al. | |
| 2020/0205104 A1 | 6/2020 | Akkarakaran et al. | |

OTHER PUBLICATIONS

Applied Radio Labs (NPL titled "Group Delay Explanations and Applications", www.radio-labs.com, Nov. 15, 1999 (Year: 1999).*

"3rd Generation Partnership Project; Technical Specification Group Services and System Aspects; Service requirements for the 5G system; Stage 1 (Release 17)", 3GPP TS 22.261, V17.3.0, Jul. 2020, 83 pages.

"3rd Generation Partnership Project; Technical Specification Group Services and System Aspects; Study on Communication for Automation in Vertical Domains (Release 16)", 3GPP TR 22.804, V16.3.0, Jul. 2020, pp. 1-197.

"3rd Generation Partnership Project; Technical Specification Group Radio Access Network; NR; Physical layer procedures for data (Release 16)", 3GPP TS 38.214, V16.2.0, Jun. 2020, pp. 1-163.

"New WID: NR Positioning Support", 3GPP TSG RAN Meeting #83, RP-190752, Agenda: 9.1.1, Intel Corporation, Mar. 18-21, 2019, 6 pages.

"Introduction of NR positioning support", 3GPP TSG-RAN WG1 Meeting #99, R1-1913661, Ericsson, Nov. 18-22, 2019, 11 pages.

"New SID on NR Positioning Enhancements", 3GPP TSG RAN Meeting #86, RP-193237, Agenda: 9.1.1, Qualcomm Incorporated, Dec. 9-12, 2019, 4 pages.

"QPQ1287 2350 MHz RF BAW Filter—Band 40", Qorvo, Retrieved on Nov. 22, 2021, Webpage available at : https://www.qorvo.com/products/p/QPQ1287.

"QPQ1297 Band 3 BAW Duplexer", Qorvo, Retrieved on Nov. 22, 2021, Webpage available at : https://www.qorvo.com/products/p/QPQ1297.

"Multilayer Band Pass Filter for 27.5-29.5GHz", TDK, RF Components, Oct. 2019, 6 pages.

Wang et al., "Design of ladder-type SAW/BAW filters with constant group delay", IEEE International Ultrasonics Symposium, Oct. 18-21, 2011, pp. 345-348.

"Group Delay in Filters", Microwaves101, Retrieved on Nov. 22, 2021, Webpage available at : https://www.microwaves101.com/encyclopedias/group-delay-in-filters.

"Discussion of NR positioning enhancements", 3GPP TSG RAN WG1 Meeting #102, R1-2005712, Agenda: 8.5.3, CATT, Aug. 17-28, 2020, pp. 1-21.

Wang et al., "A Fitting Method of RF Channel Group Delay Characteristics for High Precision Navigation", IEEE 10th International Conference on Electronics Information and Emergency Communication (ICEIEC), Jul. 17-19, 2020, pp. 26-30.

Grimm, "Dirty RF Signal Processing for Mitigation of Receiver Front-end Non-linearity", Dissertation, 2014, 236 pages.

Office action received for corresponding Finnish Patent Application No. 20206167, dated Apr. 1, 2021, 9 pages.

* cited by examiner

GROUP DELAY COMPENSATION

FIELD

This present specification relates to group delay compensation.

BACKGROUND

A group delay of a filter defines a time delay of a signal through the filter as a function of frequency. There remains a need for further developments in group delay compensation.

SUMMARY

In a first aspect, this specification describes an apparatus comprising means for performing: providing a filtered transmit signal for transmission using a transmit forward path of a transmitter of a mobile communication system; receiving a receive signal using a wideband transmit feedback path of the transmitter of the mobile communication system; generating an estimate of a transfer function (H(z)) of the transmit forward path; and calculating a filter function for compensating for said estimated transfer function of the transmit forward path. The apparatus may comprise an uplink group delay compensation module. The filter function may be for compensating for in-band group delay ripple of the transmit forward path and residual absolute delay of the transmit forward path.

The estimate of said transfer function may be generated based on one or more of: an unfiltered transmit signal, the filtered transmit signal, the receive signal and a transfer function (G(z)) of the wideband transmit feedback path.

The apparatus may further comprise means for performing: generating said filtered transmit signal from the unfiltered transmit signal (TX_REF) using a filtering function. The filtering function may includes a previous iteration of the filter function for compensating for said estimated transfer function of the transmit forward path. The filtering function may include a time shift (which time shift may seek to compensate for residual absolute delay of the transmit forward path).

The apparatus may further comprise means for performing: determining whether one or more of one or more trigger variables are above a relevant trigger threshold; and updating said filter function accordingly. The trigger variables may comprise one or more of: transmitter antenna load, temperature, Vbat, current and aging.

The apparatus may further comprise means for performing: generating a parameterisation of the filter function. The filter function may be parameterised by at least carrier frequency and bandwidth.

The apparatus may further comprise means for performing: providing a wideband transmit signal for transmission using a test transmit chain at the receiver; receiving the transmitted wideband transmit signal; generating the estimate of the transfer function of said receiver downlink path based, at least in part, of the received transmitted wideband signal. The wideband transmit signal may be transmitted during inactive transmission slots at the receiver of the mobile communication system.

In a second aspect, this specification describes an apparatus comprising means for performing: generating an estimate of a transfer function (H(z)) of a receiver downlink path at a receiver of a mobile communication system; and calculating a filter function for compensating for said estimated transfer function. The apparatus may comprise an downlink group delay compensation module. The filter function may be for compensating for in-band group delay ripple of the receiver downlink path and residual absolute delay of the receiver downlink path.

The apparatus may further comprise means for performing: obtaining data from a lookup table for use in generating the estimate of said transfer function. The data may be obtained from said lookup table based on one or more variables including: receiver path identity, frequency, bandwidth and temperature.

The apparatus may further comprise means for performing: providing a wideband transmit signal for transmission using a test transmit chain at the receiver; receiving the transmitted wideband transmit signal; generating the estimate of the transfer function of said receiver downlink path based, at least in part, of the received transmitted wideband signal. The wideband transmit signal may be transmitted during inactive transmission slots at the receiver of the mobile communication system.

In the first or the second aspect, the said means may comprise: at least one processor; and at least one memory including computer program code, the at least one memory and the computer program configured, with the at least one processor, to cause the performance of the apparatus.

In a third aspect, this specification describes method comprising: providing a filtered transmit signal for transmission using a transmit forward path of a transmitter of a mobile communication system; receiving a receive signal using a wideband transmit feedback path of the transmitter of the mobile communication system; generating an estimate of a transfer function of the transmit forward path; and calculating a filter function for compensating for said estimated transfer function of the transmit forward path. The filter function may be for compensating for in-band group delay ripple of the transmit forward path and residual absolute delay of the transmit forward path.

The estimate of said transfer function may be generated based on an unfiltered transmit signal, the filtered transmit signal, the receive signal and a transfer function (G(z)) of the wideband transmit feedback path.

The method may further comprise: generating said filtered transmit signal from the unfiltered transmit signal (TX_REF) using a filtering function. The filtering function may include a previous iteration of the filter function for compensating for said estimated transfer function of the transmit forward path. The filtering function may include a time shift (e.g. for compensating of residual absolute delay of the transmit forward path).

The method may further comprise: generating a parameterisation of the filter function. The filter function may be parameterised by at least carrier frequency and bandwidth.

The method may further comprise: providing a wideband transmit signal for transmission using a test transmit chain at the receiver; receiving the transmitted wideband transmit signal; generating the estimate of the transfer function of said receiver downlink path based, at least in part, of the received transmitted wideband signal. The wideband transmit signal may be transmitted during inactive transmission slots at the receiver of the mobile communication system.

In a fourth aspect, this specification describes a method comprising: generating an estimate of a transfer function of an receiver downlink path at a receiver of a mobile communication system; and calculating a filter function for compensating for said estimated transfer function. The filter function may be for compensating for in-band group delay ripple of the receiver downlink path and residual absolute delay of the receiver downlink path.

The method may further comprise: obtaining data from a lookup table for use in generating the estimate of said transfer function. The data may be obtained from said lookup table based on one or more variables including: receiver path identity, frequency, bandwidth and temperature.

The method may further comprise: providing a wideband transmit signal for transmission using a test transmit chain at the receiver; receiving the transmitted wideband transmit signal; generating the estimate of the transfer function of said receiver downlink path based, at least in part, of the received transmitted wideband signal. The wideband transmit signal may be transmitted during inactive transmission slots at the receiver of the mobile communication system.

In a fifth aspect, this specification describes computer-readable instructions which, when executed by computing apparatus, cause the computing apparatus to perform (at least) any method as described with reference to the third or fourth aspects.

In a sixth aspect, this specification describes a computer-readable medium (such as a non-transitory computer-readable medium) comprising program instructions stored thereon for performing (at least) any method as described with reference to the third or fourth aspects.

In a seventh aspect, this specification describes an apparatus comprising: at least one processor; and at least one memory including computer program code which, when executed by the at least one processor, causes the apparatus to perform (at least) any method as described with reference to the third or fourth aspects.

In an eighth aspect, this specification describes a computer program comprising instructions for causing an apparatus to perform at least the following: providing a filtered transmit signal for transmission using a transmit forward path of a transmitter of a mobile communication system; receiving a receive signal using a wideband transmit feedback path of the transmitter of the mobile communication system; generating an estimate of a transfer function of the transmit forward path; and calculating a filter function for compensating for said estimated transfer function of the transmit forward path.

In a ninth aspect, this specification describes a computer program comprising instructions for causing an apparatus to perform at least the following: generating an estimate of a transfer function of an receiver downlink path at a receiver of a mobile communication system; and calculating a filter function for compensating for said estimated transfer function.

In an tenth aspect, this specification describes a work product comprising a database or a lookup table, created by means of any method as described with reference to the third or fourth aspects.

In an eleventh aspect, this specification describes an apparatus comprising means (such as a group delay compensation module) for providing a filtered transmit signal for transmission using a transmit forward path of a transmitter of a mobile communication system; means (such as wideband transmit feedback path of a mobile communication system) for receiving a receive signal; means (such as a processor) for generating an estimate of a transfer function of the transmit forward path; and calculating a filter function for compensating for said estimated transfer function of the transmit forward path.

In a twelfth aspect, this specification describes an apparatus comprising means (such as a wideband receiver path of a mobile communication system) for generating an estimate of a transfer function of an receiver downlink path at a receiver of a mobile communication system; and means (such as a processor) for calculating a filter function for compensating for said estimated transfer function.

BRIEF DESCRIPTION OF THE DRAWINGS

Example embodiments will now be described, by way of example only, with reference to the following schematic drawings, in which.

DETAILED DESCRIPTION

Figure 1:
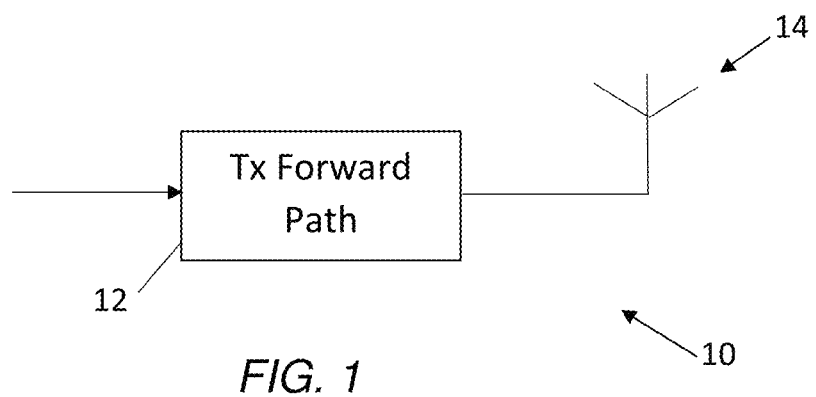
FIG. 1 is a block diagram of a transmitter in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a transmitter, indicated generally by the reference numeral 10, in accordance with an example embodiment. The transmitter 10 includes a transmitter forward path module 12 that receives a signal for transmission. The output of the transmitter forward path module 12 is provided to an antenna 14.

Figure 2:
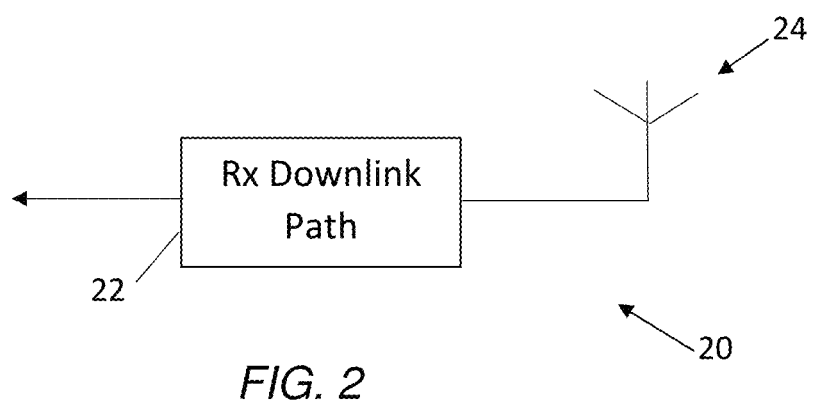
FIG. 2 is a block diagram of a receiver in accordance with an example embodiment.

FIG. 2 is a block diagram of a receiver, indicated generally by the reference numeral 20, in accordance with an example embodiment. The receiver 20 includes a receiver downlink path 22 that receives a signal from an antenna 24 and outputs a receiver signal.

The transmitter forward path 12 filters the signal for transmission. Similarly, the receiver downlink path 22 filters the received signal.

A user equipment (UE) radio frequency (RF) transceiver chain may apply filtering of the transmitted/received signal (for example using modules such as the transmitter forward path module 12 and the receiver downlink path module 22) such that frequency components of a signal are delayed during filtering. The group delay of a filter (which may be measured in seconds) is defined as the time delay of the signal through the device under test as a function of frequency. For example, in the case of a modulated sine wave (e.g. an AM radio signal), the group delay is a measure of the time taken by the modulated signal to pass through the system.

An ideal filter may have a group delay that is constant and a phase change with frequency that is linear. However, for real world implementations, group delay distortions may occur, as signals at different frequencies take different amounts of time to pass through a filter.

Figure 3:
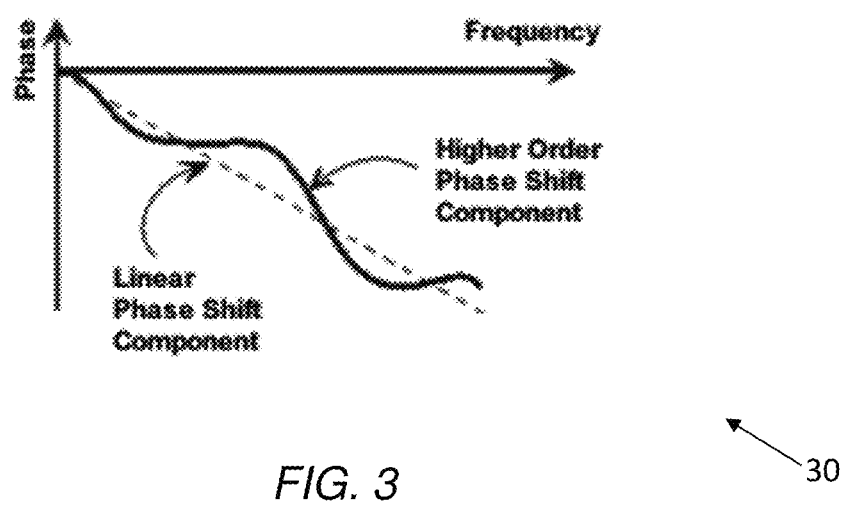
FIG. 3 is a plot showing an aspect of group delay in accordance with an example embodiment.

FIG. 3 is a plot, indicated generally by the reference numeral 30, showing an aspect of group delay in accordance with an example embodiment. The plot 30 shows a phase characteristic of a device (such as a filter) that includes both linear and higher order phase shift components. A linear phase shift component may represent an average signal transit time. Higher order phase shift component(s) may present variations in transit time for different frequencies.

UE cellular filters may exhibit group delay variations dependent on type and frequency band. For example, filters designed for frequency bands requiring high stopband rejection at proximity frequencies for co-existence may show high group delay (GD) variation.

User device positioning may use methods such as: Downlink Time Difference of Arrival (DL-TDOA); Uplink Time Difference of Arrival (UL-TDOA); Downlink Angle of Departure (DL-AoD); Uplink Angle of Arrival (UL-AoA); and Multi-cell Round Trip Time (Multi-RTT). The accuracy of positioning methods or algorithms may be impacted by group delay and group delay variations.

Figure 4:
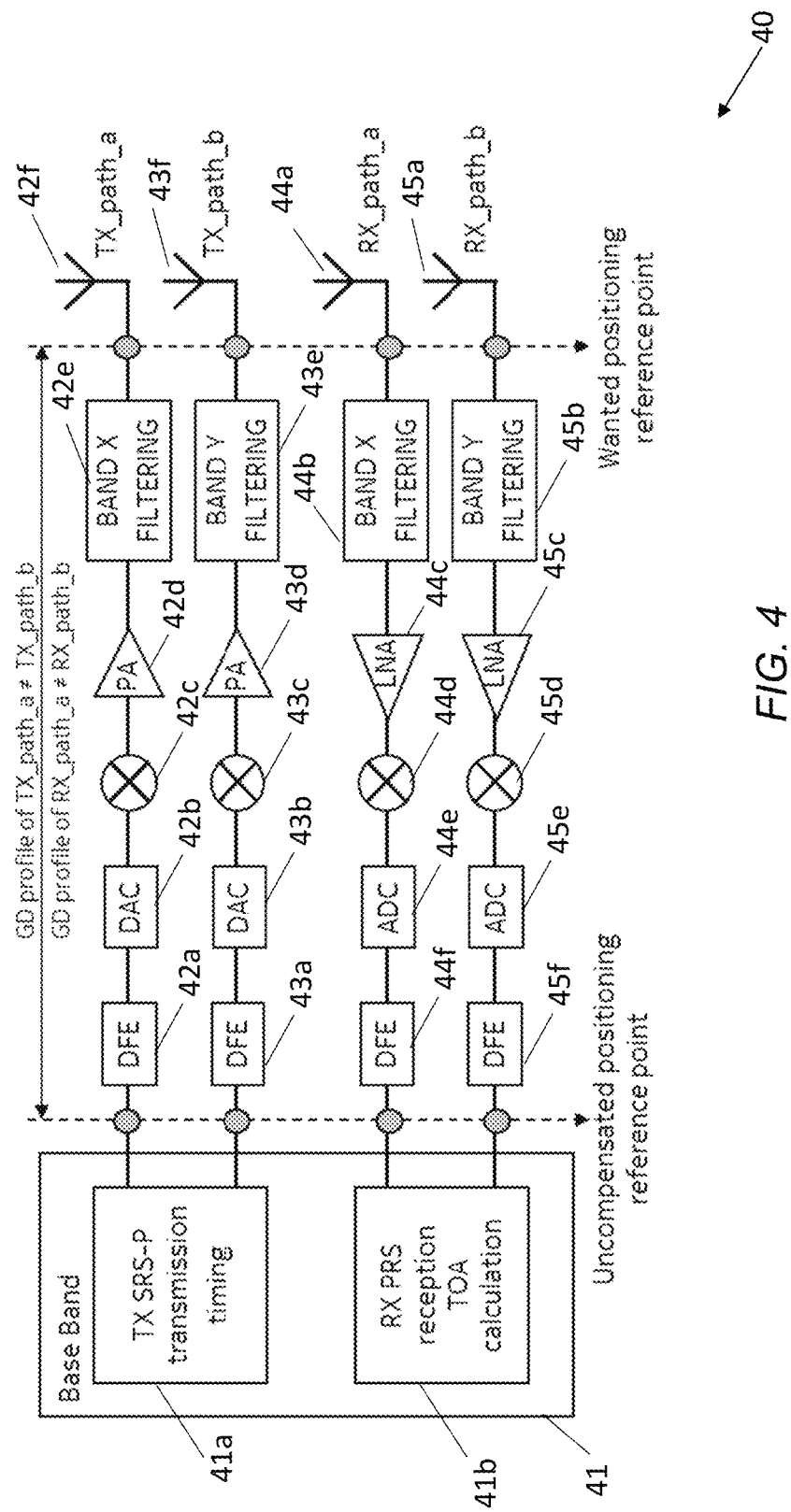
FIG. 4 is a block diagram of a system in accordance with an example embodiment.

FIG. 4 is a block diagram of a system, indicated generally by the reference numeral 40, in accordance with an example embodiment. The system 40 is a simplified UE transceiver system comprising both transmitter paths and receiver paths. Specifically, the system 40 comprises a first transmitter path (TX_path_a), a second transmitter path (TX_path_b), a first receiver path (RX_path_a), and a second receiver path (RX_path_b).

The system 40 comprises a baseband processing unit 41 having a transmission module 41a providing signals for transmission using the first and second transmitter paths and a receiver module 41b receiving signals from the first and second receiver paths.

The first transmitter path (TX_path_a) has a digital front end (DFE) module 42a, a digital-to-analogue converter (DAC) 42b, a modulator 42c, a power amplifier 42d, a filter 42e and an antenna or aerial 42f. Similarly, the second transmitter path (TX_path_b) has a DFE, module 43a, a DAC 43b, a modulator 43c, a power amplifier 43d, a filter 43e and an aerial 43f.

The first receiver path (RX_path_a) has an aerial 44a, a filter 44b, an amplifier 44c, a demodulator 44d, an ADC 44e and a DFE 44f. Similarly, the second receiver path (RX_path_b) has an aerial 45a, a filter 45b, an amplifier 45c, a demodulator 45d, an ADC 45e and a DFE 45f.

Cellular positioning for 5G New Radio (NR) may be based on: downlink-based reference signals measured in the UE, uplink-based reference signals transmitted from the UE or a combination thereof. A 5G NR UE radio may include RF filtering in both the transmitter and the receiver and common for all positioning scenarios is that the receive and/or transmit path of the UE will influence the time delay of the position reference signal depending on one or more of the frequency, bandwidth, temperature and the selected RX/TX path. In the simplified UE transceiver system 40 described above, different frequency bands are supported by physically different radio RX/TX paths and for MIMO applications, the same frequency band may be supported on several radio paths. If uncompensated, the reference point for positioning will be at the UE processing node i.e. at the baseband. As such, any delay from/to the antenna will be included in the time of arrival (TOA)/time of departure (TOD) of positioning reference signals(PRS)/sounding reference signals (SRS-P) respectively. This may lead to positioning errors.

Figure 5:
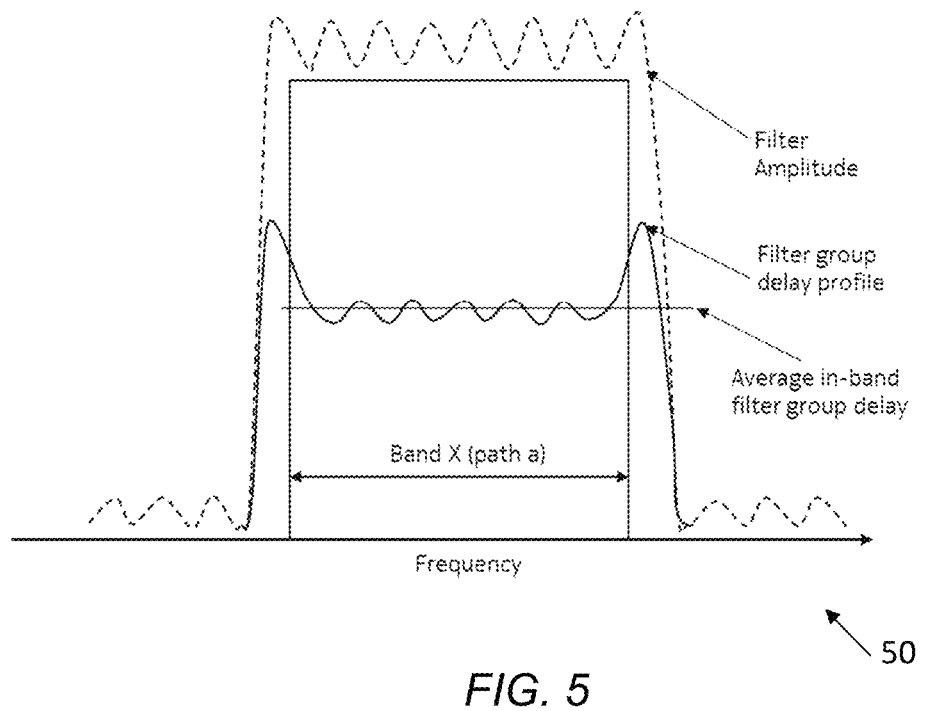
FIG. 5 is a plot showing an aspect of group delay in accordance with an example embodiment.

FIG. 5 is a plot, indicated generally by the reference numeral 50, showing an aspect of group delay in accordance with an example embodiment.

For large bandwidth and/or for bands with hard out-of-band attenuation requirements, not only may an average group delay be of significance, but also a group delay variation within a desired band may be of significance. By way of example, the plot 50 shows a simplified sketch of a Surface Acoustic Wave (SAW) filter-like UE RF path amplitude and group delay response. For the entire band, an average group delay can be calculated, but due to in-band group delay ripple, each frequency component within the band may experience a different delay.

As such, receiving or transmitting reference signals within different sub-bands/subcarriers for a given RF path can result in different average group delay and group delay ripple.

Thus, in the case of positioning systems making use of NR positioning reference signals or similar protocols, positioning accuracy can be impacted by both:

Average group delay (path delay) of the UE receiver and/or transmitter within the bandwidth of a reference signal; and In-band group delay variation for a selected path within the bandwidth of a reference signal.

If all positioning reference signals are received/transmitted at the same time, at the same temperature and with full path bandwidth allocation, it may be sufficient to compensate for the average group delay (path delay). However, if reference signals are located in different sub-bands, then the in-band group delay variation can become a significant source of error if left uncompensated. In one example positioning system, an error of just 1 ns can result in a positioning error of the order of 30 cm.

Figure 6:
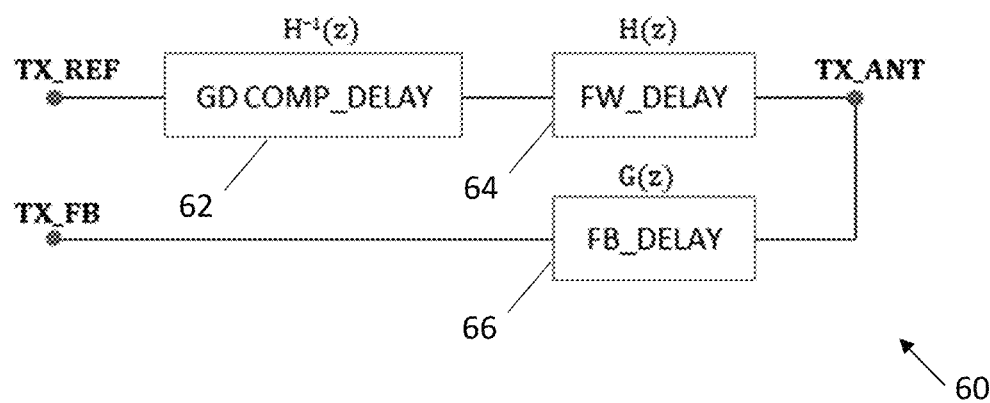
FIG. 6 is a block diagram of a system in accordance with an example embodiment.

FIG. 6 is a block diagram of a system, indicated generally by the reference numeral 60, in accordance with an example embodiment.

The system 60 comprises a group delay compensation delay module 62, a transmit forward path 64 and a wideband transmit feedback path 66. As described further below, the transmit forward path 64 may comprises elements such as one or more filters, modulators, amplifiers, digital-to-analogue converters etc.

The group delay compensation delay module 62 receives an unfiltered transmit signal (TX_REF) for transmission by a transmitter of a mobile communication system. The unfiltered transmit signal is filtered by the group delay compensation delay module 62 (as discussed in detail below) to provide a filtered transmit signal.

The transmit forward path 64 is used for transmitting the filtered transmit signal. Specifically, the transmit forward path 64 provides a signal TX_ANT to an antenna of a mobile communication system.

The transmit forward path 64 of the system 60 has a transfer function H(z) that describes the group delay of the transmit forward path. If the group delay compensation module 62 has a transfer function $H^{-1}(z)$ that applies the inverse group delay to that provided by the transmit forward path 64 (as indicated schematically in FIG. 6), then compensation of the group delay can be provided.

A receive signal is obtained by the wideband transmit feedback path 66. As discussed in detail below, an estimate of a transfer function H(z) of the transmit forward path 64 may be generated based on the received signal. A filter function $H^{-1}(z)$ for compensating for said estimated transfer function of the transmit forward path 64 can be calculated and used to define the functionality of the group delay compensation delay module 62. Note that the group delay compensation module 62 may compensate for both in-band group delay ripple of the transmit forward path 64 and residual absolute delay (average delay) of the transmit forward path.

The wideband transmit feedback path 66 may be used for functions such as power control, TX spectrum capture and for relative equalization purposes like digital pre-distortion (DPD). Such feedback paths may have wide bandwidth to enable capture of, for example, 3-5 times the TX signal bandwidth. As such the feedback path may exhibit flat group delay within the TX signal bandwidth insensitive to dynamic environment changes and it is therefore feasible to characterise the FB path transfer, G(z), for each RF transmitter path in the lab/UE production line, as discussed further below.

Figure 7:
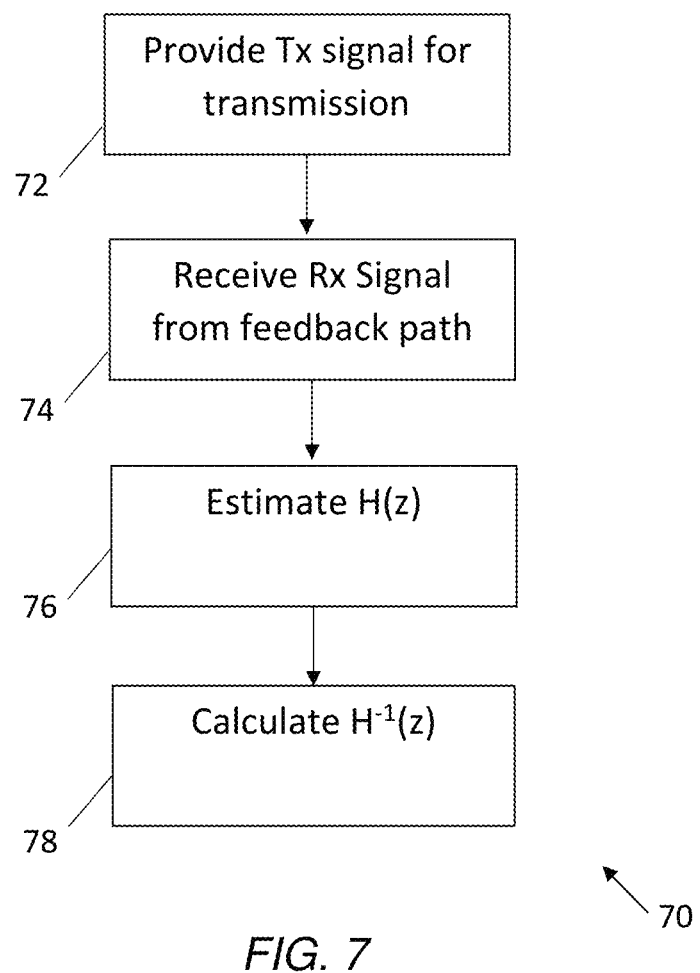
FIG. 7 is a flow chart showing an algorithm in accordance with an example embodiment.

FIG. 7 is a flow chart showing an algorithm, indicated generally by the reference numeral 70, in accordance with an example embodiment. The algorithm 70 may be implemented using the system 60.

The algorithm 70 starts at operation 72 where a filtered transmit signal for transmission is provided. As discussed above, the filter transmit signal may be generated (from an unfiltered signal TX_REF) by the group delay compensation delay module 62 and prepared for transmission by the transmit forward path 64.

At operation 74, a receive signal is received from a wideband transmit feedback path of the transmitter of the mobile communication system.

At operation 76, an estimate of a transfer function (H(z)) of the transmit forward path is generated. The estimate of said transfer function may be based on the unfiltered transmit signal (TX_REF), the filtered transmit signal, the receive signal and a transfer function (G(z)) of the wideband transmit feedback path.

At operation 78, a filter function $H^{-1}(z)$ for compensating for said estimated transfer function of the transmit forward path is calculated.

The operation 72 may include generating said filtered transmit signal from the unfiltered transmit signal (TX_REF) using a filtering function. As discussed further below, the filtering function may include a previous iteration of the filter function for compensating for said estimated transfer function of the transmit forward path.

In one example embodiment, the system 60 and the algorithm 70 may be used to capture an undistorted and time unshifted SRS-P TX signal (TX_REF) and a feedback path signal (TX_FB) tapped at the antenna and via a priori knowledge of G(z) and any already applied compensation, timing offset (TX_SHIFT) and $H^{-1}(z)$, to estimate the TX forward path transfer H(z) within the frequency range of the transmitted SRS-P and thereby dynamically update the GD compensation online in the field to seek to increase positioning accuracy.

Figure 8:
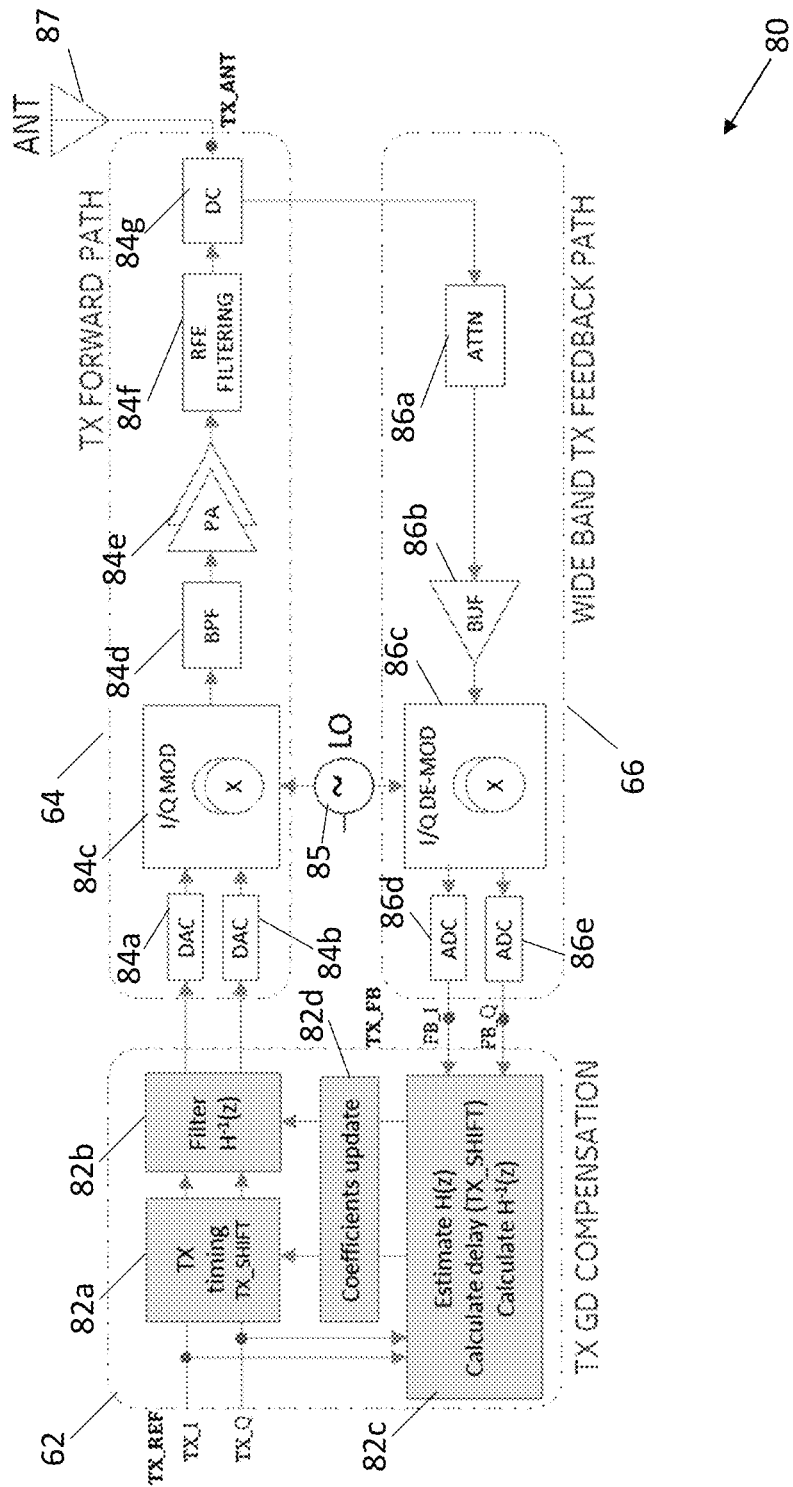
FIG. 8 is a block diagram of a system in accordance with an example embodiment.

FIG. 8 is a block diagram of a system, indicated generally by the reference numeral 80, in accordance with an example embodiment. The system 80 is an example implementation of the system 60 described above and may be used to implement the algorithm 70 described above.

The system 80 comprises the group delay compensation delay module 62, the transmit forward path 64 and the wideband transmit feedback path 66 of the system 60 described above.

The group delay compensation delay module 62 receives the unfiltered transmit signal (TX_REF) for transmission by a transmitter of a mobile communication system. The unfiltered transmit signal includes in-phase (TX_I) and quadrature (TX_Q) components.

The filtering function of the group delay compensation module 62 is implemented by a TX timing shift module 82a and a filter module 82b. The filter module 82b implements the transfer function $H^{-1}(z)$ described above. The group delay compensation module 62 further comprise a calculation module 82c and a coefficients update module 82d, as discussed further below.

The filtered transmit signal output by the filter 82b comprises filtered versions of the in-phase and quadrature signal (TX_I and TX_Q).

The transmit forward path 64 comprises a first DAC 84a, a second DAC 84b, an I/Q modulator 84c, bandpass filter 84d, power amplifiers 84e, an RFE filtering module 84f and a Direction Coupler (DC) module 84g.

The first DAC 84a receives the filtered in-phase signal (TX_I) and provides an analogue version of that signal to the I/Q modulator 84c. Similarly, the second DAC 84b receives the filtered quadrature signal (TX_Q) and provides an analogue version of that signal to the I/Q modulator 84c. The modulator 84c uses a local oscillator 85 to generate a modulated signal for transmission. That modulated signal is amplified and processed to generate the transmission signal (TX_ANT), which signal is provided both to the wideband transmit feedback path 66 and to an antenna 87.

The wideband transmit feedback path 66 comprises an attenuator 86a, a buffer 86b, an I/Q demodulator 86c, a first ADC 86d and a second ADC 86e.

The transmission signal TX_ANT is attenuated by the attenuator 86a and buffered by the buffer 86b. The attenuated and buffered signal is provided to the demodulator 86c. Using the local oscillator 85, the demodulator generates in-phase and quadrature feedback signals.

The in-phase and quadrature feedback signals are converted to digital signals by the first and second ADCs 86d and 86e respectively and are provided to the group delay compensation module 62 as feedback signals FB_I and FB_Q.

The calculation module 82c of the group delay compensation module 62 generates estimates of H(z), TX_SHIFT and $H^{-1}(z)$. Those values are used by the coefficients update module 82d to update coefficients of the TX timing shift module 82a and the filter module 82b.

Figure 9:
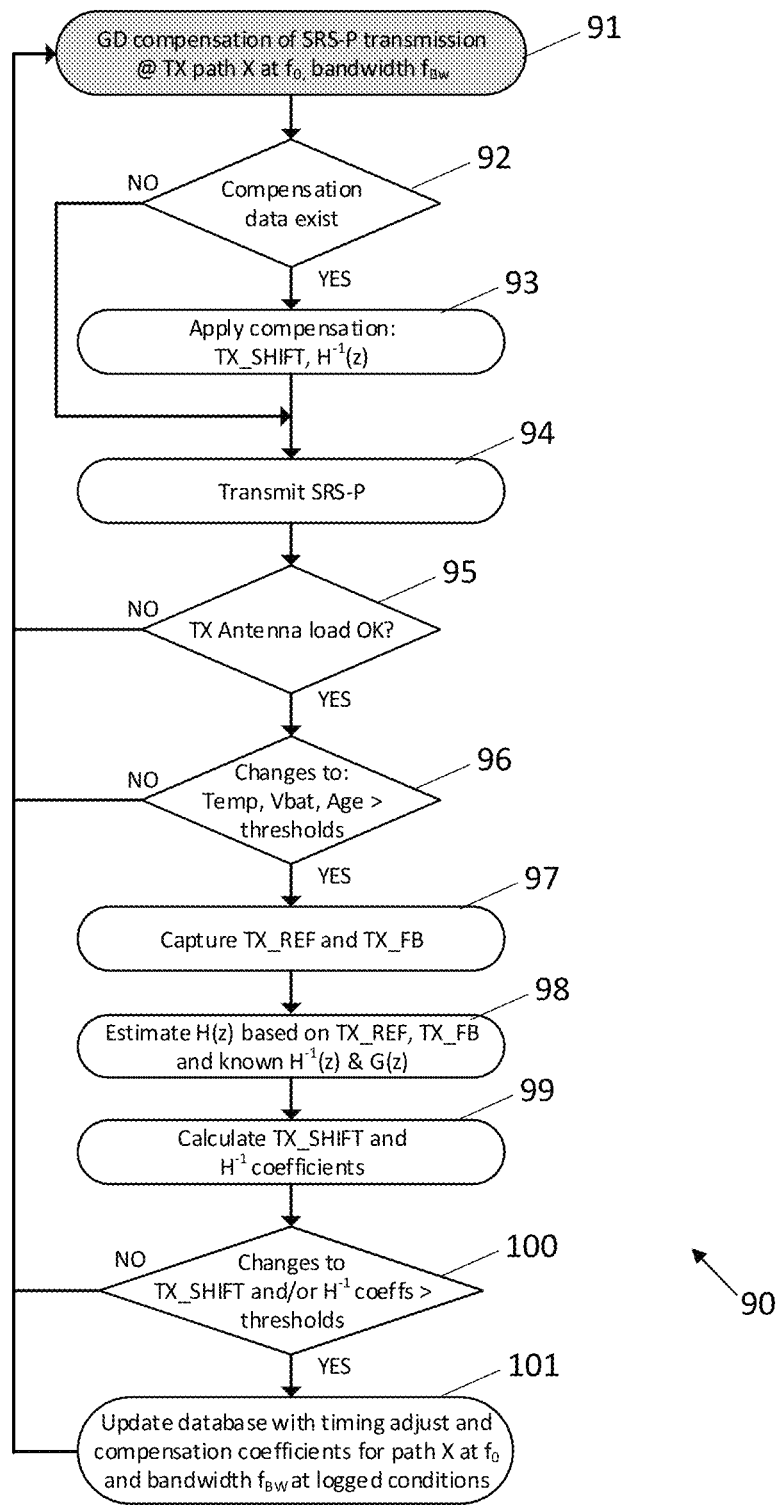
FIGS. 9 to 12 are flow charts showing algorithms in accordance with an example embodiments.

FIG. 9 is a flow chart showing an algorithm, indicated generally by the reference numeral 90, in accordance with an example embodiment. The algorithm 90 is a positioning algorithm that may be implemented using the system 80 described above. The algorithm 90 makes use of sounding reference signals (SRS), however other positioning protocols may make use of the principles describes herein.

During production, a calibration/characterization process may be implemented during which group delay and transfer characteristics of the wideband feedback receiver path are characterized, and compensation values stored in the device, G(z). These parameters may be used during the algorithm 90 as discussed further below.

The algorithm 90 starts at operation 91, where a group delay (GD) compensation procedure is initiated in a normal operation mode for each active SRS-P TX path with SRS-P transmission at frequency $f_0$ at bandwidth $f_{BW}$.

A determination is made at operation 92 regarding whether compensation data (e.g. production data) exists. If so, the previously obtained compensation parameters are loaded (in operation 93) prior to SRS-P transmission. The compensation parameters include any absolute transmission timing shift (TX_SHIFT) and associated compensation transfer coefficients ($H^{-1}(z)$).

At operation 94, the UE starts SRS-P transmission according to timing dictated by the positioning scheme. The present antenna load condition is evaluated at operation 95, and only if not in a sever mismatch condition, a dynamic update of the compensation settings is deemed feasible.

Antenna loading is evaluated, for example using proximity sensors, ACLR measurements, Vbat current etc. If the antenna load is okay, then the algorithm process to operation 96.

At operation 96, a determination is made regarding whether one or more trigger variables are above a relevant trigger threshold. For example, the operation 96 may determine whether operating conditions have changed significantly compared with previous compensation calibration. For example, temperature, battery voltage, ageing etc. may be evaluated with respect to set thresholds. Other possible trigger variables include transmitter antenna load, Vbat and current. If a trigger condition is detected, then the algorithm 90 moves to operation 97.

At operation 97, a re-estimation of the group delay compensation data is initiated. In the operation 97, undistorted SRS-P transmit signal (TX_REF) and the feedback receiver signal (TX_FB) are captured At operation 98, the forward path transfer H(z) is estimated based on the sampled TX_REF, TX_FB I/Q waveforms, known transfer characteristics (G(z) and $H^{-1}(z)$) and applied TX_SHIFT.

Updated TX_SHIFT and $H^{-1}(z)$ coefficients are calculated at operation 99 and compared to previous values against set thresholds. A determination is made at operation 100 regarding whether the coefficients determined in operation 99 are significantly different. If so, the updated compensation parameters are stored in UE database (at operation 101) for use during subsequent SRS-P transmissions under same conditions.

The algorithm 90 may be run for all active UE SRS-P TX paths (CA), over bands, antennas and/or for any change to SRS-P frequency and bandwidth. By doing so, the SRS time of departure, TOD, reference point may be arranged to be located at the TX antenna no matter the present positioning UL configuration and field conditions.

The re-characterisation of the group delay compensation for a given TX path may be carried out on live transmission data and thus, to avoid GD distortion of the signal, the compensation filter may be prevented from being adjusted during the actual transmission but only afterwards for the benefit of future transmissions within the same frequency range.

A UE could continuously re-run characterization of all TX paths whenever there is scheduled uplink traffic, but this would create a sizeable processing overhead for the UE. To ensure that TX paths that are presently used for SRS-P transmissions are frequently re-characterized, the following procedure may be used (although alternatives are possible):

The UE keeps a log of SRS-P transmissions history, including e.g. TX path, frequency and bandwidth;

Whenever an uplink transmission is scheduled at a TX path and within band of previous SRS-P transmissions a re-characterization is triggered. This may be triggered for any kind of UL traffic since the re-characterization procedure inherently de-embeds any UL signal frequency selectivity;

Each SRS-P transmission history log entry may have an associated timeout window to flush outdated entries assumed not in use anymore.

The method establishes the active TX antenna as the physical reference location for all UL positioning transmissions. By applying further timing offsets for each active SRS transmission path any physical location on the UE form factor design can be defined as the positioning reference.

The proposed TX path group delay compensation procedure may be used not only for UL TDOA but also for multi-RTT positioning e.g. together with RX based group delay compensation methods.

Figure 10:
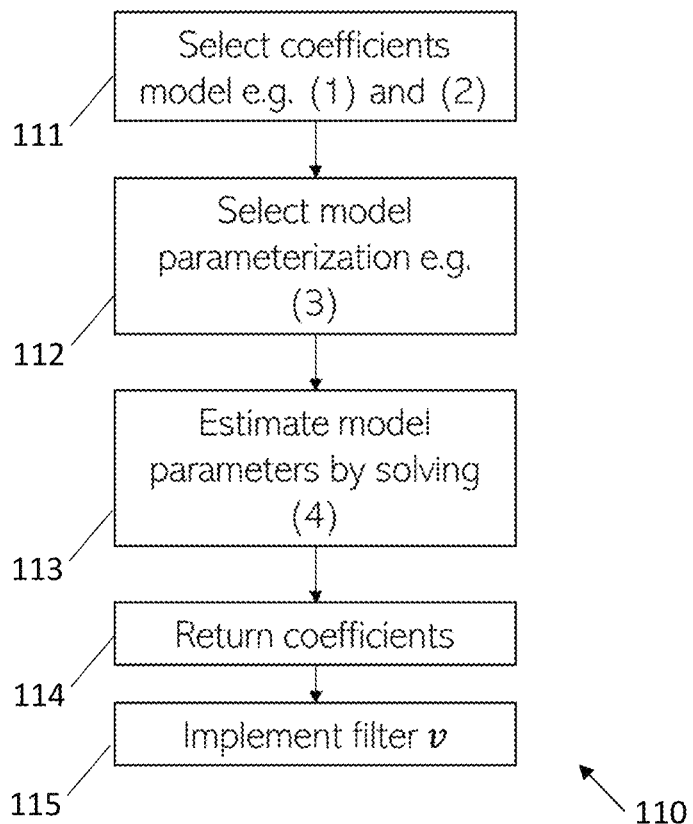

FIG. 10 is a flow chart showing an algorithm, indicated generally by the reference numeral 110, in accordance with an example embodiment. The algorithm 110 may be used for generating a parameterisation of the filter function. For example, for each physical transmitter path, the inverse of the filter response, e.g. $V(z)=H^{-1}(z)$ may be parameterized by both the carrier frequency $f_c$ and bandwidth b.

If we assume a polynomial filter of P-th order, where the coefficients depend on the pair ($f_c$, b) the response of the filter in time domain reads:

$$v(n)=\Sigma h_p(\tau,f_c,b)\Pi\delta(n-\tau) \tag{1}$$

Presented with an input $x_{rf}$, the filter outputs a response $y_{rf}=(v*x_{rf})(n)$. (Where * denotes the convolution operation and $\delta$ is the Dirac function.)

The coefficients $h_p$ ($\tau$, $f_c$, b), p=1:P can be modeled as:

$$h_p(\tau,f_c,b)=g_p(h_p(0),f_c,b), \tag{2}$$

Where $g_p$ is a non-linear function depending on an initial coefficient value, and the current carrier and bandwidth. For example, the function $g_p(\ )$ may be chosen as:

$$g_p(X)=X_p\beta_p+\epsilon_p, \tag{3}$$

Where $X_p$=diag[$h_p(0)$, $f_c$, b].

Introducing (3) in (2) and then (1), the task becomes that of estimating the model parameters $\widehat{\beta_p}$, $\widehat{\epsilon_p}$, $\hat{P}$ characterizing the filter coefficients. The problem may be cast as:

$$\widehat{\beta_p},\widehat{\epsilon_p},\hat{P}=\arg \min\|TX_{FB}-TX_{REF}\|_2^2 \tag{4}$$

Where $TX_{FB}$, $TX_{REF}$ are the corrected signal (i.e. GD-corrected signal, as captured by the feedback receiver) and the reference undistorted signal, respectively. Problem (4) may be solved with an algorithm of choice, e.g. Newton method, regression analysis, etc.

In one example implementation, the combined effects of applying the time offset TX_SHIFT, i.e. $f(TX_{SHIFT})$, and the inverse response $H^{-1}(z)$ may be jointly estimated into a combined response $S(z)=f(TX_{SHIFT})*H^{-1}(z)$, where the operator (*) may denote convolution.

The algorithm 110 starts at operation 111, where coefficients are selected, for example based on the formulae (1) and (2) discussed above. At operation 112, a model parameterization is selected. At operation 113, model parameters are estimated, for example by solving the formula (4) discussed above. At operation 114, coefficients generated by the previous operations of the algorithm are returned and, at operation 115, the filter as defined by the coefficients is implemented.

The embodiments described above generally relate to uplink GD delay compensation. This is not essential to all example embodiments.

Figure 11:
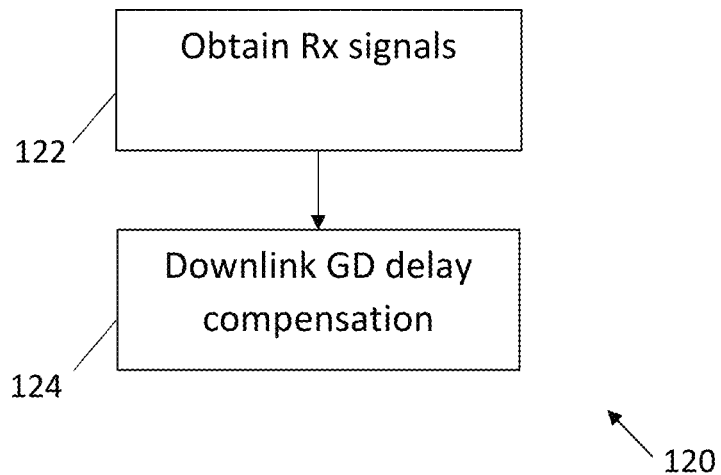

FIG. 11 is a flow chart showing an algorithm, indicated generally by the reference numeral 120, in accordance with an example embodiment. The algorithm 120 starts at operation 122 where Rx signals are received at a receiver of a mobile communication system. For example, Rx signals may be obtained using one of more of the receiver paths of the system 40 described above.

At operation 124 of the algorithm 120, downlink group delay (GD) compensation is performed to seek to compensate of variable delays in the received signals. A number of mechanisms for performing downlink GD compensation are discussed further below.

One option for downlink GD delay compensation is based on lab characterization of RX group delay, for example for each band/RX path and over temperature. These values may be stored in lookup tables in the device and based on the operating RX path, frequency, bandwidth, and temperature the RX group delay can be estimated over the desired operating frequency range and represented as a filter. The inverse of this filter can be used to compensate for the group delay.

Figure 12:
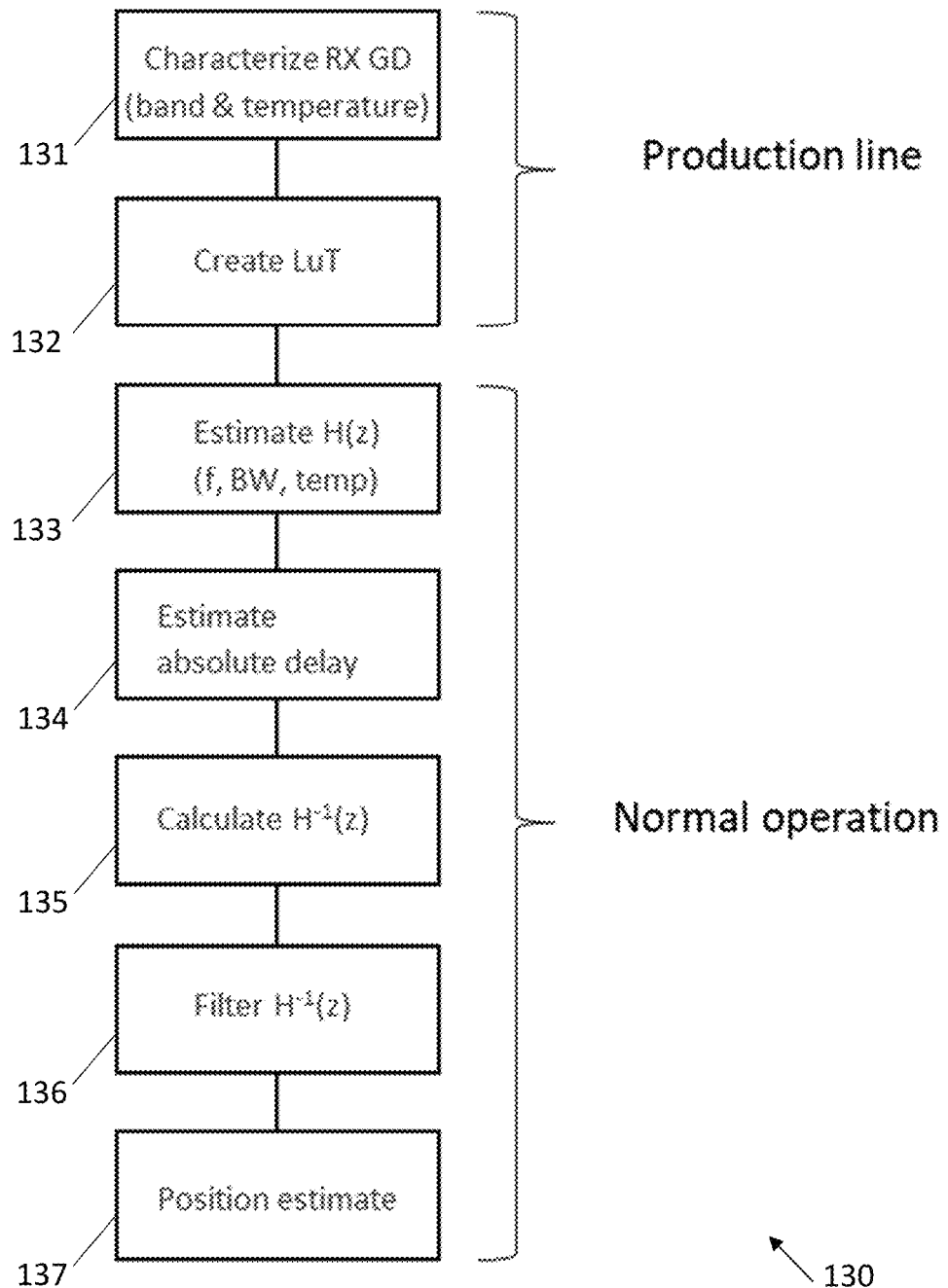

FIG. 12 is a flow chart showing an algorithm, indicated generally by the reference numeral 130, in accordance with an example embodiment. The algorithm 130 is an example implementation of the lookup table approach to handling RX group delay. The algorithm 130 may be based on lab characterization of RX group delay for each band/path and over temperature. These values can be stored in lookup tables or a database in the device and based on the operating RX path, frequency, bandwidth, and temperature the RX group delay can be estimated over the desired operating frequency and represented as a filter. The inverse of this filter can be used to compensate for the group delay.

The algorithm 130 comprises operations 131 and 132 that are performed as part of device production or calibration and further operations 133 to 137 that represent a normal operation of the system.

At operation 131, for each band and RF path, the RX group delay is characterised over the entire frequency range. For a few selected temperatures, the RX group delay profile change may be characterized. At operation 132, a lookup table is generated characterising the group delay based on a variety of parameters.

At operation 133, a transfer function H(z) of the RX filter from antenna to digital domain is estimated. This is referred to as "dynamic delay".

At operation 134, the average group delay (or "absolute delay") is estimated.

A time domain filter $H^{-1}(z)$ is generated at operation 135 and used to filter the received signal in operation 136. Thus, the absolute group delay is adjusted based on the time domain filer.

At operation 137, downlink-based positioning estimation may be performed based on the compensated delay data.

The algorithm 130 can be implemented without hardware changes to existing systems being required.

Thus, the algorithm 130 can be used to implement the operation 124 of the algorithm 120 by generating an estimate of a transfer function H(z) of a receiver downlink path at a receiver of a mobile communication system and calculating a filter function for compensating for said estimated transfer function. Specifically, data can be obtained from a lookup table for use in generating the estimate of said transfer function, which data may be obtained from the lookup table based on one or more variables such as receiver path identity, frequency, bandwidth and temperature.

Figure 13:
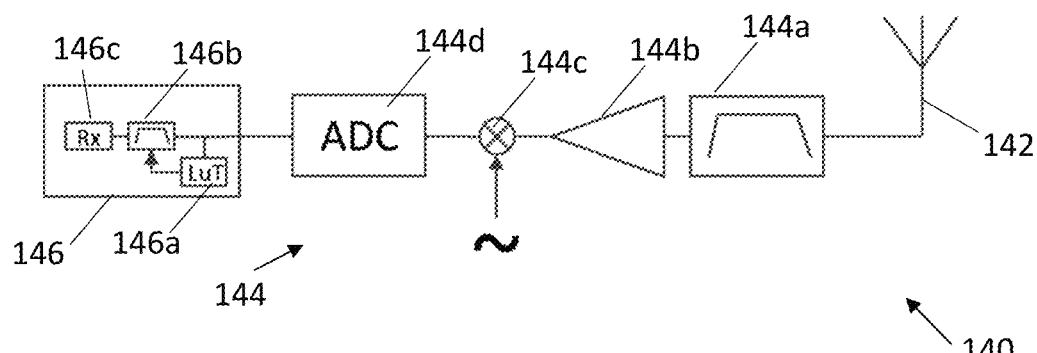
FIGS. 13 and 14 are block diagrams of systems in accordance with example embodiments.

FIG. 13 is a block diagram of a system, indicated generally by the reference numeral 140, in accordance with an example embodiment. The system 140 shows a receiver architecture including a lookup table (LUT) that may be used to implement the algorithm 130 described above.

The system 140 comprises an antenna 142, a wideband receiver path 144 and a group delay compensation module 146. The wideband receiver path 144 comprises a filter 144a, a buffer 144b, a demodulator 144c and an ADC module 144d. The group delay compensation module 146 comprises a lookup table 146a, a filter 146b that is dependent on the output of the lookup table, and a receiver output 144c.

The wideband receiver path 144 is the source of group delay for which compensation is implemented by the group delay compensation module 146.

Other RX group delay compensation schemes are possible in addition to, or instead of, the lookup table based arrangement described above. One example approach comprising providing a wideband transmit signal for transmission using a test transmit chain at the receiver, receiving the transmitted wideband transmit signal and generating an estimate of the transfer function of said receiver downlink path based, at least in part, of the received transmitted wideband signal.

Figure 14:
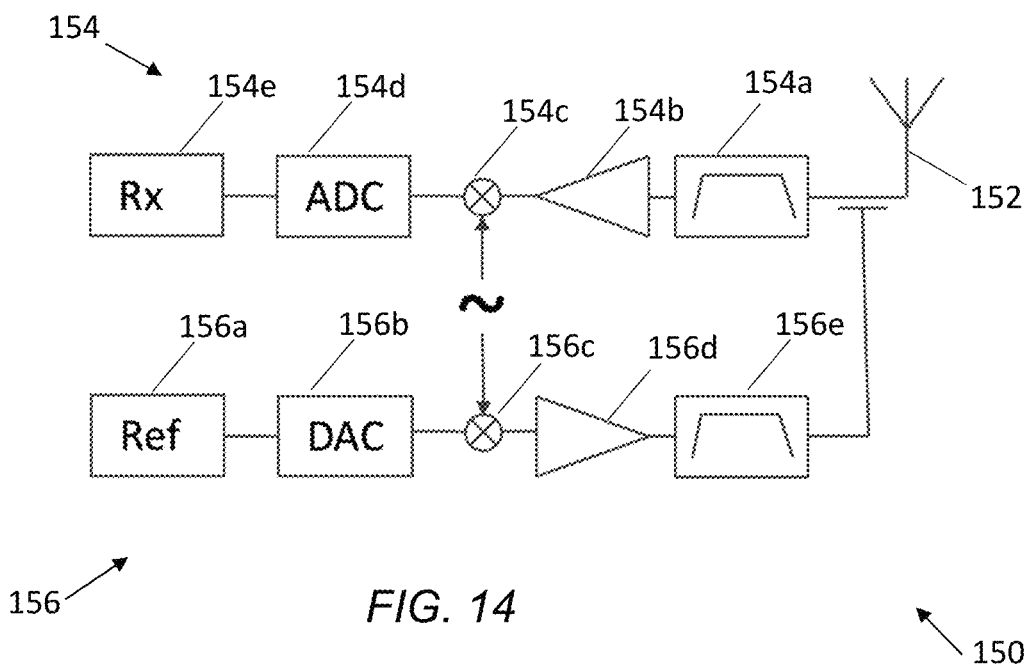

FIG. 14 is a block diagram of a system, indicated generally by the reference numeral 150, in accordance with an example embodiment.

The system 150 comprises a receiver architecture comprising an antenna 152, a wideband receiver path 154 and a test transmit chain 156. The wideband receiver path 154 comprises a filter 154a, a buffer 154b, a demodulator 154c, an ADC module 154d and a receiver output 154e. The test transmit chain 156 comprises a reference signal 156a, a DAC module 156b, a modulator 156c, an amplifier 156d and a filter 156e.

The test transmit chain 156 may have a transmit power below the emission mask and in a bandwidth beyond the RX path band of operation. During an inactive slot (e.g. when there are no RX and TX activities in the device), the test transmitter can send the reference signal 156a at the wanted RX frequency and bandwidth coupled to the RX antenna path. The receiver may receive the reference signal and estimate the transfer function including group delay. The estimated transfer function of the RX group delay can be represented as a filter. The inverse of this filter can be used to compensate for the group delay. The estimate of a new transfer function estimate may be triggered based on parameters such as: temperature, bandwidth, frequency and/or aging.

Figure 15:
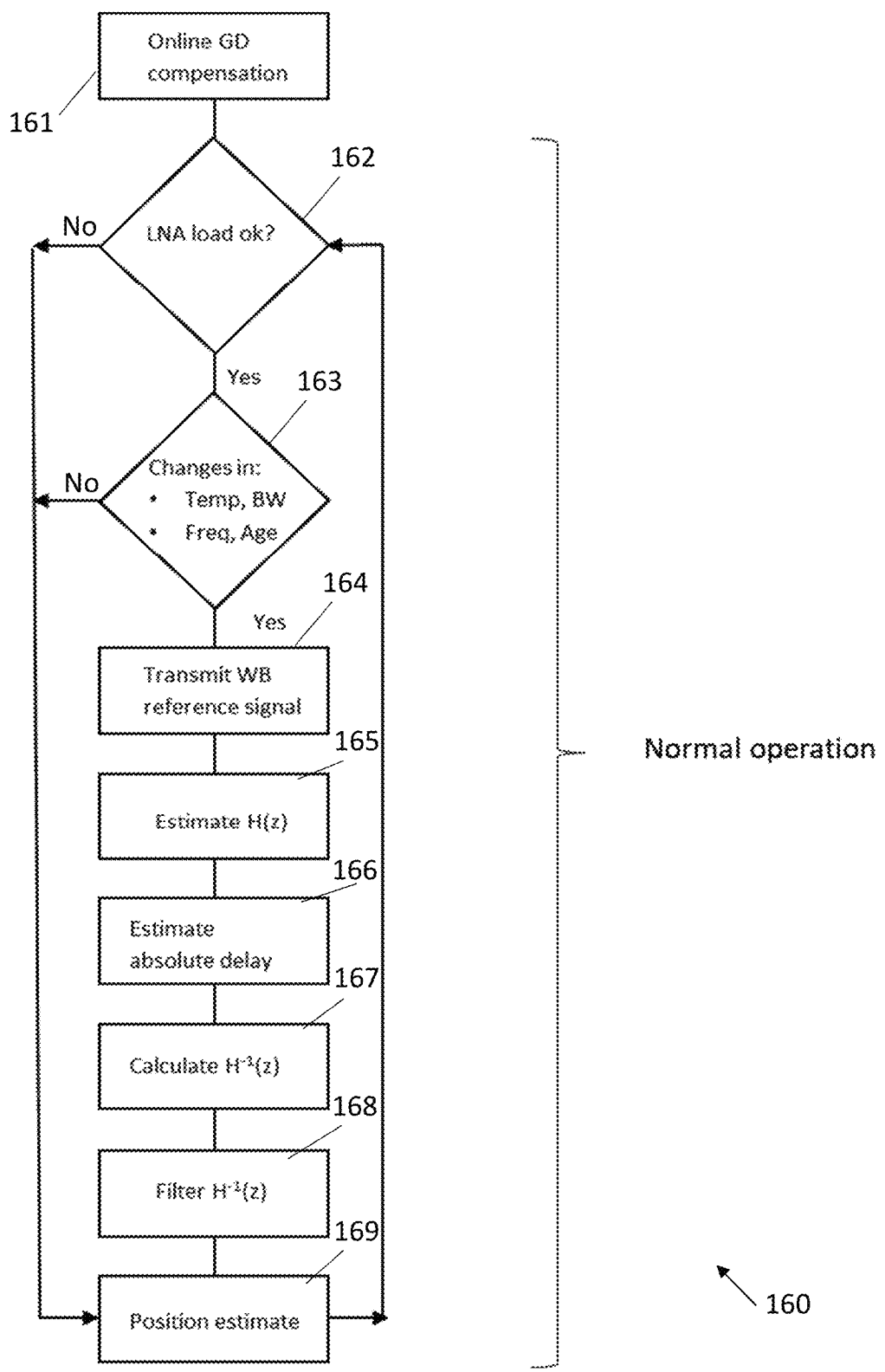
FIG. 15 is a flow chart showing an algorithm in accordance with an example embodiment.

FIG. 15 is a flow chart showing an algorithm, indicated generally by the reference numeral 160, in accordance with an example embodiment. The algorithm 160 may be implemented using the system 150 described above. The algorithm 160 shows an example method for updating group delay parameters as part of a position estimation process.

The algorithm 160 starts at operation 161 where an online group delay compensation algorithm is called.

At operation 162, a determination is made regarding whether a load mismatch is occurring. If a load mismatch is occurring (i.e. the LNA is "not OK"), the algorithm moves to operation 169, where a position estimation algorithm is called.

At operation 163, a determination is made regarding whether changes have occurred that should trigger an estimation of a new transfer function H(z). Such triggers may include changes in one or more of: temperature, bandwidth, frequency or aging.

At operation 164, a wideband reference signal is transmitted (e.g. using the test transmit chain 156). The wideband reference signal may have a flat spectrum and an output power below emission mask in an inactive timeslot.

At operation 165, a transfer function H(z) of the RX filter is estimated (i.e. the dynamic delay referred to above).

At operation 166, the average group delay (the absolute delay) is calculated.

At operation 167, a time domain filter $H^{-1}(z)$ is generated.

At operation 168, the received signal is filtered using the time domain $H^{-1}(z)$.

Finally, existing downlink-based positioning estimation is performed at operation 169.

It should be noted that the principles of the look up table embodiment (e.g. the algorithm 130) and the online group delay embodiment (e.g. the algorithm 160) may be combined in a joint look up table and online group delay compensation algorithm.

Figure 16:
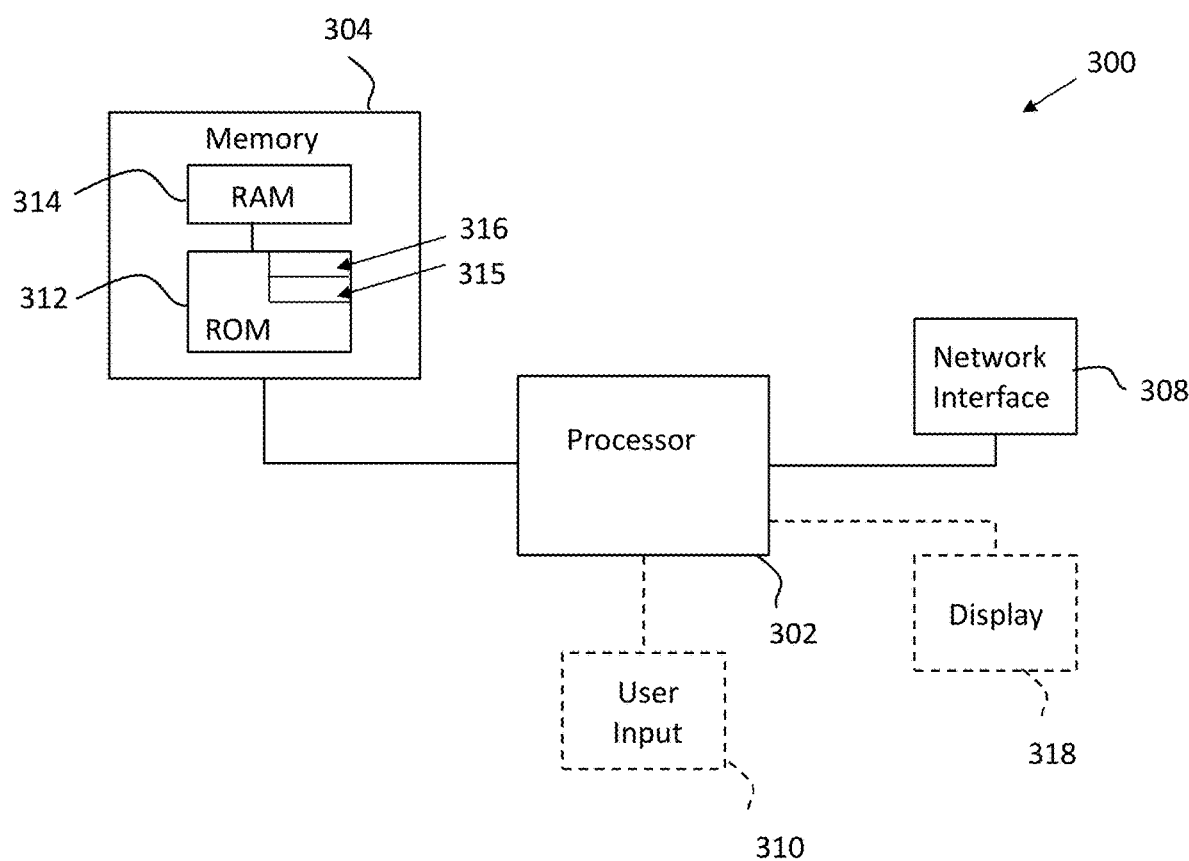
FIG. 16 is a block diagram of components of a system in accordance with an example embodiment.

For completeness, FIG. 16 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 70, 90, 110, 120, 130 and 160 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 17A:
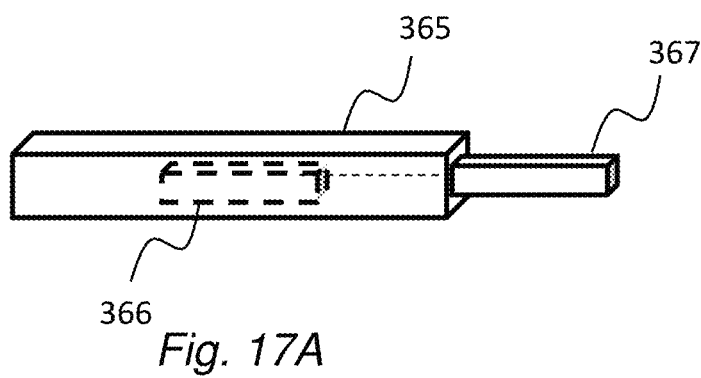
FIGS. 17A and 17B show tangible media, respectively a removable non-volatile memory unit and a compact disc (CD) storing computer-readable code which when run by a computer perform operations according to example embodiment.
Figure 17B:
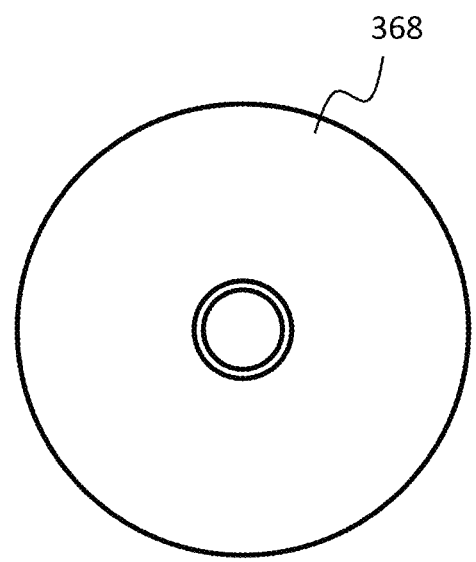

FIGS. 17A and 17B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used.

Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 7, 9, 10, 11, 12 and 15 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification. For example, RX group delay may be used as part of multi RTT group delay compensation together with TX based group delay compensation methods. Alternatively, or in addition, a test transmitter may transmit a narrow band test signal swept across the wanted RX frequency range instead of a wide-band test signal described above. This may reduce the complexity of designing a flat wide-band injection path (but may increase the sweep time).

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
    at least one processor; and
    at least one memory including computer program code which, when executed by the at least one processor, cause the apparatus to perform:
    generating a filtered transmit signal from an unfiltered transmit signal using a filtering function for compensating for in-band group delay ripple of a transmit forward path of a transmitter of a mobile communication system and residual absolute delay of the transmit forward path;
    providing the filtered transmit signal for transmission using the transmit forward path of the transmitter;
    receiving a receive signal using a wideband transmit feedback path of the transmitter of the mobile communication system;
    generating an estimate of a transfer function of the transmit forward path; and
    calculating an update of a filter function for compensating for in-band group delay ripple of the transmit forward path and residual absolute delay of the transmit forward path, wherein said filtering function includes a previous iteration of the filter function for compensating for said estimated transfer function of the transmit forward path.

2. An apparatus as claimed in claim 1, wherein the updated filter function is stored for use during subsequent transmissions.

3. An apparatus as claimed in claim 1, wherein the receive signal is tapped at an antenna of the transmitter.

4. An apparatus as claimed in claim 1, wherein generating the estimate of said transfer function comprises generating said estimate based on the unfiltered transmit signal, the filtered transmit signal, the receive signal and a transfer function of the wideband transmit feedback path.

5. An apparatus as claimed in claim 1, wherein said filtering function and said updated filter function include time shifts.

6. An apparatus as claimed in claim 1, wherein the computer program code, when executed by the at least one processor, further causes the apparatus to perform:
    determining whether one or more of one or more trigger variables are above a relevant trigger threshold; and
    updating said filter function accordingly.

7. An apparatus as claimed in claim 1, wherein the computer program code, when executed by the at least one processor, further causes the apparatus to perform: generating a parameterisation of the filter function.

8. An apparatus comprising:
    a timing shift module and a filter module for generating a filtered transmit signal from an unfiltered transmit signal using a filtering function for compensating for in-band group delay ripple of a transmit forward path of a transmitter of a mobile communication system and residual absolute delay of the transmit forward path;
    a group delay compensation module for providing the filtered transmit signal for transmission using the transmit forward path of the transmitter;
    a wideband transmit feedback path of a mobile communication system for receiving a receive signal using a wideband transmit feedback path of the transmitter of the mobile communication system;
    a calculation module for generating an estimate of a transfer function of the transmit forward path; and
    a coefficients update module for calculating an update of a filter function for compensating for in-band group delay ripple of the transmit forward path and residual absolute delay of the transmit forward path, wherein said filtering function includes a previous iteration of the filter function for compensating for said estimated transfer function of the transmit forward path.

9. A method comprising:
    generating a filtered transmit signal from an unfiltered transmit signal using a filtering function for compensating for in-band group delay ripple of a transmit forward path of a transmitter of a mobile communication system and residual absolute delay of the transmit forward path;
    providing the filtered transmit signal for transmission using the transmit forward path of the transmitter;
    receiving a receive signal using a wideband transmit feedback path of the transmitter of the mobile communication system;
    generating an estimate of a transfer function of the transmit forward path; and
    calculating an update of a filter function for compensating for in-band group delay ripple of the transmit forward path and residual absolute delay of the transmit forward path, wherein said filtering function includes a previous iteration of the filter function for compensating for said estimated transfer function of the transmit forward path.

10. A computer program, embodied on a non-transitory computer readable medium, the computer program when executed by a processor, causes the processor to perform at least the following:
    generating a filtered transmit signal from an unfiltered transmit signal using a filtering function for compensating for in-band group delay ripple of a transmit forward path of a transmitter of a mobile communication system and residual absolute delay of the transmit forward path;
    providing the filtered transmit signal for transmission using the transmit forward path of the transmitter;
    receiving a receive signal using a wideband transmit feedback path of the transmitter of the mobile communication system;
    generating an estimate of a transfer function of the transmit forward path; and
    calculating an update of a filter function for compensating for in-band group delay ripple of the transmit forward path and residual absolute delay of the transmit forward path, wherein said filtering function includes a previous iteration of the filter function for compensating for said estimated transfer function of the transmit forward path.

* * * * *